United States Patent Office 2,770,765
Patented Nov. 13, 1956

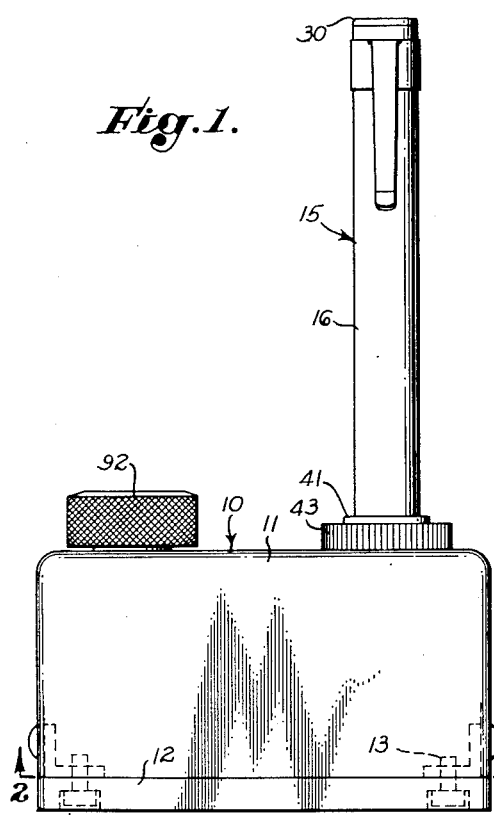
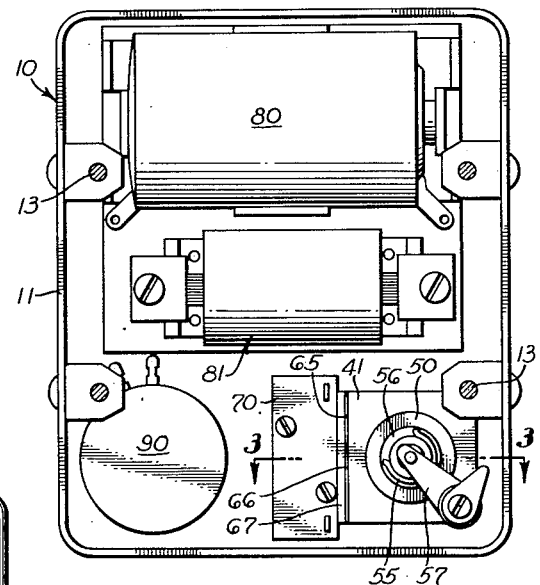
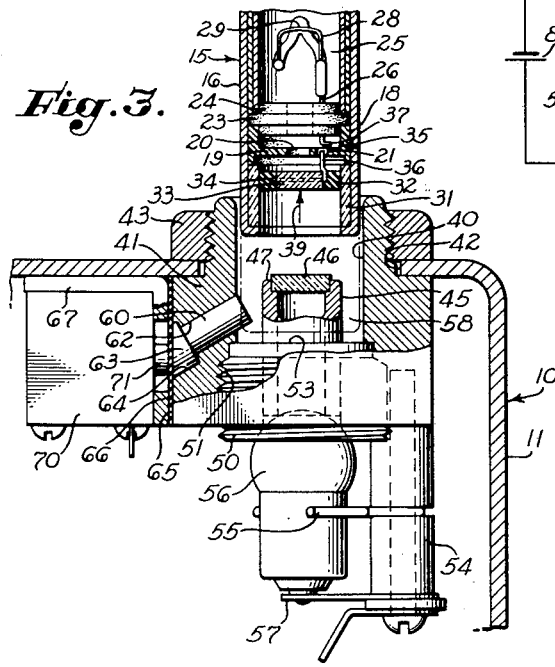
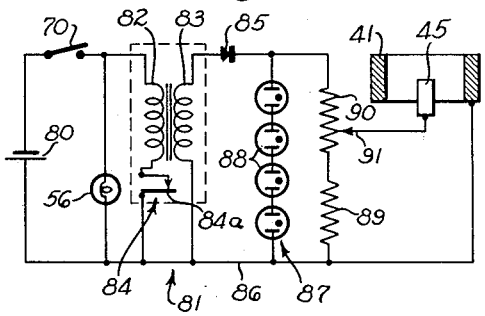
INVENTOR.
ROBERT W. NEGUS
BY HIS ATTORNEYS.
HARRIS, KIECH, FOSTER & HARRIS

2,770,765
DOSIMETER CHARGING UNIT

Robert W. Negus, Monrovia, Calif., assignor to Arnold O. Beckman, Inc., South Pasadena, Calif., a corporation of California Application January 12, 1954, Serial No. 403,540

13 Claims. (Cl. 320—1)

My invention relates to dosimeter charging units designed to apply an electric charge to an electroscope forming a part of a dosimeter designed to measure radiation received by personnel exposed to X-rays, gamma rays, or other nuclear radiation. The invention is particularly well adapted to the charging of dosimeters having a built-in charging switch. Such dosimeters may be of the type disclosed in the patent to Arnold O. Beckman et al. No. 2,613,327 or in my co-pending application Serial No. 405,300, filed January 21, 1954 entitled Dosimeter.

With such dosimeters it is desirable to apply a charge through a post forming a part of the charging unit and capable of actuating the charging switch of the dosimeter when the dosimeter is moved toward the charging unit. It is also desirable that the charging unit incorporate a switch controlling the energization of the post in response to relative movement between the dosimeter and the charging unit. It is an object of the present invention to provide a novel charging unit of this general type, although various features of the invention can be used in conjunction with other charging units or other dosimeters. In this latter connection, it is an object to provide a charging unit that can be used to charge all standard construction dosimeters as well as the dosimeter particularly exemplified herein.

It is an important object of the invention to provide a simple charging unit, economical of manufacture and very dependable in operation. A further object of the invention is to reduce costs by employing a relatively cheap battery, e. g., a single flashlight-type battery that is light in weight and very economical in replacement cost.

It is another object of the invention to provide a dosimeter charging unit employing a vibrator power supply for stepping up the voltage of the battery to produce a potential sufficient to charge the dosimeter. In this connection, it is an object of the invention to employ a step-up transformer having a primary winding energized through a vibrator switch which is in turn actuated by a magnetic field set up by the primary winding.

A further object of the invention is to provide a charging unit that is rugged and which incorporates a hermetic seal preventing entry of moisture into the unit during the charging operation or at other times. This hermetic seal is preferably associated with a plunger moved by the dosimeter, this plunger actuating a switch controlling the energization of the post. It is an object of the invention to provide such a structure.

Various other objects and advantages will be apparent to those skilled in the art from the following description of an exemplary embodiment.

Referring to the drawing:

Fig. 1 is an elevational view showing the dosimeter charging unit with a typical dosimeter inserted in the charging well thereof;

Fig. 2 is a bottom view of the charging unit with the cover removed, taken substantially as indicated by the line 2—2 of Fig. 1;

Fig. 3 is an enlarged sectional view taken along the line 3—3 of Fig. 2, showing a typical dosimeter as it is entering the charging well; and Fig. 4 is a wiring diagram of the illustrated embodiment.

Referring particularly to Fig. 1, the dosimeter charging unit is indicated by the numeral 10 and includes a substantially rectangular enclosure 11 formed of a single piece of drawn metal closed at its lower end by a relatively heavy plate 12 held in place by a plurality of screws 13 with countersunk heads. Fig. 1 shows a typical dosimeter 15 in place preparatory to being charged.

The illustrated dosimeter 15 is of a construction described specifically in my co-pending application supra. The present drawing shows only certain details adjacent the lower open end of a tubular housing 16 of the dosimeter. Suffice it to say that a plastic sleeve element 18 is secured in place in the housing 16 and provides a diaphragm or web 19 having a central opening 20 and a side opening 21.

The upper end of the sleeve element 18 engages a projecting ring 23 of an insulator member 24 which forms the effective lower boundary of an ionization chamber 25. A support wire 26, preferably coated in its upper inverted V-shaped portion, carries a small conducting fiber 28 which is repelled by the support wire 26 when the dosimeter is charged. The fiber 28 provides an upper portion 29 which moves perpendicular to the paper and toward the support wire 26 as a function of incident ionizing radiation entering the chamber 25. The upper end of tubular housing 16 of the dosimeter contains optical and reticule elements by which the operator can observe an image of the upper portion 29 of the fiber 28 superimposed on a reticule or scale when the eye is placed close to an eyepiece 30. Adequate observation requires light transmission through the tubular housing 16 of the dosimeter, as by directing the dosimeter toward a source of light. The invention provides an artificial source of light in the enclosure 11 to illuminate the electroscope elements during charging so that the degree of charge can be adjusted to a predetermined scale reading.

The lower open end of the housing 16 of the dosimeter is occupied by a sleeve 31 of insulating material. A contact ring 32 formed of rubber or other elastic material is suitably secured within the sleeve 31 and is molded around a glass window 33 encircled by a bent wire 34 having one end bent to extend axially of the housing to form a contact at an electroscope charging switch 35, this contact being indicated at 36 and being aligned with the side opening 21. All surfaces of the glass of the window 33 are made electrically conducting, as by diffusing thereinto a metal oxide or by other processes known in the art, whereby the window 33 becomes an electrically conducting transparent element.

The electroscope charging switch 35 includes also the lower end of the wire 26, which extends downwardly from the insulator member 24 to provide a bent portion forming a contact 37, this contact being also aligned with the side opening 21. If a force is applied to the window 33 in the direction indicated by arrow 39, the resiliency of the ring 32 permits the contacts 36 and 37 to engage at a position within or adjacent to the side opening 21. If the window 33 is at a charging potential at the time, as contemplated by the invention, such engagement of the contacts 36 and 37 will charge the electroscope of the dosimeter.

The enclosure 10 provides a well 40 adapted to receive the end of the dosimeter 15. This well is formed by a metallic well member 41 having a threaded neck which extends through an opening 42 in the top of the enclosure 10 and which receives a clamp nut 43 holding the well member and its associated structure in place within the enclosure 10.

Extending upwardly in the well 40 is a switch-actuating post 45, formed of electrically conducting material, shaped to fit into the open end of the housing of the dosimeter 15 to actuate the electroscope charging switch 35 upon relative movement between the dosimeter and the charging unit. The post 45 is preferably hollow, to provide an axial opening closed at its upper end by a window 46 sealed in place in a countersunk portion. This window is also electrically conducting, preferably by making it of a glass disc treated on all of its surfaces to make these surfaces conducting, as by diffusing a metal oxide into the surfaces. The uppermost portion of the post 45 is formed by a surface 47 of the window 46, this surface being engageable with the lower face or surface of the window 33 to exert thereon a reaction force in the direction of the arrow 39 when the dosimeter is moved in a direction towards the post 45, this reaction force temporarily closing the electroscope charging switch 35 as mentioned above.

The post 45 is carried by the well member 41 through an insulator member 50 threaded into an opening 51 and suitably cemented in place. The insulator member 50 provides a surface 53 forming the bottom of the well 40 and engageable by the end of the dosimeter housing 16 to act as a stop means therefor, if such a construction is desired.

Depending from the well member 41 is a supporting post 54 carrying a terminal 55 which partially encircles and supports the base of an incandescent bulb 56 disposed directly below the axial opening of the post 45. The end terminal of the incandescent bulb 56 is engaged by an insulated terminal 57 also carried by the supporting post 54.

Within the well 40 around the post 45 is an annular channel 58 into which extends one end of a plunger 60. This plunger has an intermediate portion that is slidable in an inclined passage 62 formed in the well member 41. The plunger 60 is cylindrical and provides a head 63 fitting in an unequal-depth counterbore 64 of the passage 62. The well member 41 provides a surface 65 disposed at an angle relative to the axis of the passage 62. The head 63 is cut at a similar angle and normally lies substantially parallel to the surface 65. A flexible diaphragm in the form of a sheet of elastic material 66 is clamped against the surface 65 by a switch bracket 67.

Mounted on this bracket 67 is an operating switch 70 of the type having normally-open contacts which are closed by slight inward movement of a plunger 71. The sheet of elastic material 66 separates and is engaged on opposite sides by the plungers 60 and 71, forming a medium through which pressure can be transferred from the plunger 60 to the plunger 71 and vice versa. In addition, the sheet of elastic material 66 traverses the passage 62 and forms a hermetic seal preventing ingress of moisture into the interior of the enclosure 11.

It will be observed that one end of the plunger 60 is operatively associated with the switch 70 and that the other end of the plunger extends into the annular channel 58 in the path of movement of the dosimeter housing 16. When the dosimeter housing is forced into the well 40, it presses the plunger 60 outwardly to close the operating switch 70 before the post 45 closes the electroscope charging switch 35. As will be described, the operating switch 70 controls the supply of a charging potential to the post 45 preparatory to closing the electroscope charging switch 35. The operating switch 70 is closed when the plunger 60 and the housing 16 are in predetermined relative positions. Further downward movement of the housing 16 causes engagement of the contacts 36 and 37 when the lower end of the housing nears the surface 53 of the insulator member 50. During this latter portion of the movement of the housing 16 the lower end of the housing wedges between the plunger 60 and the post 45 to insure that the operating switch will remain closed during actuation of the electroscope charging switch 35. Upon lifting of the housing 16 from the well 40, the normal spring action applied to the plunger 71 of the operating switch 70 returns the plunger 60 to its position shown in Fig. 3, the contacts of the operating switch 70 opening after disengagement of the contacts 36 and 37 of the electroscope charging switch 35.

Within the enclosure 11 is a source of charging potential shown as including a single-cell battery 80, preferably of the 1.5-volt flashlight type, and a vibrator power supply 81. The latter is shown as including a step-up transformer having a primary section or winding 82 and a secondary section or winding 83. The primary winding 82 is energized from the battery 80 through a vibrator switch 84 one contact of which is a part of or connected to an armature 84a within the magnetic field of the primary winding 82. As will be apparent from Fig. 4, the operating switch 70, the primary winding 82 and the vibrator switch 84 are connected serially across the battery 80. The vibrator switch 84 is normally closed so that current will flow through the primary winding 82 as soon as the operating switch 70 is closed. However, as soon as this current builds up, the magnetic action opens the vibrator switch 84. The resulting collapse of the magnetic field induces a potential across the secondary winding 83 which is much higher in peak value than the constant potential of the battery 80. The contacts of the vibrator switch 84 again close upon collapse of the magnetic field, thus re-establishing the primary circuit.

The vibrator power supply acts similar to an induction coil and produces across the secondary winding 83 an alternating potential which is converted to a unidirectional pulsating potential by a dry disc or other rectifier 85 connected to one terminal of the secondary winding 83. The other terminal of this winding is preferably connected to one of the contacts of the vibrator switch 84 through a return lead 86.

To smooth the pulsating unidirectional current I prefer to provide a filter means 87 connected between the output rectifier 85 and the return lead 86, preferably a filter means which also has a voltage regulating function, e. g., a plurality of neon glow lamps 88 connected serially between the rectifier 85 and the return lead 86. The voltage across such serially connected glow lamps is relatively constant and is applied to an output circuit or impedance means including a resistor 89 and a potentiometer 90 connected serially. This potentiometer includes an adjustable contact 91 electrically connected to the post 45. The position of the adjustable contact 91 determines the charging potential and it is desirable that this potential be adjustable during the time that the dosimeter is pressed into the well 40 and the bulb 56 energized to illuminate the scale of the dosimeter. For this reason, the adjustable contact 91 is preferably controlled by a knob 92 external of the enclosure 11, permitting the application to the electroscope of a charging potential sufficient to bring the charge to a predetermined value during illumination of the scale by the bulb 56. To insure this charging operation, it is desirable that the return lead 86 be connected to the well member 41; also that the bulb 56 be connected in parallel with the vibrator power supply 81 so as to be energized with the closing of the operating switch 70.

Various changes can be made without departing from the spirit of the invention as defined in the appended claims.

I claim as my invention:

1. A dosimeter charging unit for charging a dosimeter having an electroscope and an electroscope charging switch within a housing, said charging unit including: an enclosure; a switch actuating post; insulation means for fixedly attaching said post to said enclosure, said post being formed of electrically conducting material and being shaped to actuate said charging switch upon relative movement of said electroscope housing and said enclosure toward each other; a source of charging potential in said enclosure; an operating switch operating when actuated to supply a charging potential from said source to said post; and means responsive to such relative movement for actuating said operating switch during a first part of such relative movement to supply said charging potential to said post, said source of charging potential including a step-up transformer having a primary winding and a secondary winding, a rectifying means connecting said secondary winding to said post for supplying said charging potential thereto, a battery, and a vibrator actuated by energization of said primary winding and providing contacts connected serially with said primary winding, said battery and said operating switch.

2. A dosimeter charging unit for charging a dosimeter having a housing and an electroscope charging switch therein, said charging unit including: a switch-actuating post operatively engageable with said charging switch upon movement of said dosimeter toward said post; an insulator at the lower end of said post holding said post stationary; a movable plunger above said insulator and in the path of said movement to be engaged and moved by said dosimeter during a portion of the movement thereof; a source of charging potential; an operating switch closed by movement of said plunger to a predetermined position; and means for interconnecting said operating switch, said post and said source to apply a charging potential to said post during closure of said operating switch.

3. A dosimeter charging unit as defined in claim 2 in which said switch-actuating post is hollow, the interior of said post facing the interior of said dosimeter housing during relative movement thereof, and including a light source for directing light into said housing through said hollow post, and means for electrically energizing said light source through said operating switch when the latter is closed.

4. A dosimeter charging unit as defined in claim 2 including a wall having a passage in which said plunger slides, and including a diaphragm closing said passage, one side of said diaphragm being engaged by said plunger and the other side by said operating switch.

5. A dosimeter charging unit for charging a dosimeter having an electroscope and an electroscope charging means within a housing, said charging unit including: an enclosure; a charging post and means for electrically insulating same from said enclosure, said charging post engaging said electroscope charging means to charge said electroscope; an operating switch and means electrically connected thereto for energizing said post upon closing of said switch, said enclosure providing a wall spaced laterally from said post to provide a channel therebetween, said wall having a passage; and a plunger having a portion slidable in said passage and having one end operatively associated with said switch and another end extending laterally into said channel in the path of travel of said dosimeter housing when being moved relative to said post.

6. A dosimeter charging unit for charging a dosimeter having an electroscope and an electroscope charging means within an open-ended tubular housing, said charging unit including: an enclosure providing a well; a charging post; an electrical insulator for mounting said charging post to extend into said well for engagement with said electroscope charging means when the open end of said dosimeter housing is moved into said well; an operating switch; a source of charging potential controlled by said operating switch for energizing said post upon closing of said switch, said well providing a passage extending laterally from the vicinity of the said charging post to the vicinity of said switch; and a plunger having a portion slidable in said passage, said plunger having one end operatively associated with said switch and another end extending into said well in the path of travel of said dosimeter housing to be engaged thereby.

7. A dosimeter charging unit for applying a charge to an electroscope within a dosimeter housing, said charging unit including: an enclosure; a charging post and means for electrically insulating same from said enclosure, said post being exposed for engagement with said dosimeter; a low-voltage battery; a vibrator power supply including a step-up transformer having a primary winding and a secondary winding, said vibrator power supply including vibrator contacts opened and closed by energization of said primary winding; means for connecting said primary winding and said contacts in series across said battery; an impedance means connected across said secondary winding, said impedance means including an adjustable potentiometer means providing an intermediate contact connected to said post; and a rectifier connected between said secondary winding and said impedance means to supply thereto a unidirectional potential of sufficient magnitude to charge said electroscope.

8. A dosimeter charging unit as defined in claim 7 including a plurality of series-connected glow lamps connected across said impedance means to regulate the voltage applied thereto.

9. A dosimeter charging unit as defined in claim 7 in which said battery is a single-cell dry battery, and including an operating switch in the series circuit connecting said battery to said primary winding and means operatively connecting said dosimeter housing and said operating switch to close the latter as said housing is moved relative to said post.

10. A dosimeter charging unit as defined in claim 7 in which said intermediate contact of said potentiometer means is an adjustable contact, and including means outside said enclosure for changing the position of said adjustable contact.

11. A dosimeter charging unit for charging a dosimeter having an electroscope and an electroscope charging means within a housing, said charging unit including: an enclosure; a charging post and means for electrically insulating same from said enclosure, said charging post engaging said electroscope charging means to charge said electroscope; an operating switch and means electrically connected thereto for energizing said post upon closing of said switch, said enclosure providing a wall adjacent said post, said wall having a passage; a plunger having a portion slidable in said passage and having one end operatively associated with said switch and another end extending in the path of travel of said dosimeter housing when being moved relative to said post; and a diaphragm extending across said passage between said one end of said plunger and said switch.

12. A dosimeter charging unit as defined in claim 11, in which said wall provides a surface on which said passage opens, said diaphragm comprising a sheet of elastic material lying along said surface.

13. A dosimeter charging unit for applying a charge to an electroscope within a dosimeter housing, said charging unit including: an enclosure; a charging post and means for electrically insulating same from said enclosure, said post being exposed for engagement with said dosimeter; a low-voltage battery; a vibrator power supply including a step-up transformer having a primary winding and a secondary winding, said vibrator power supply including vibrator contacts opened and closed by energization of said primary winding; means for connecting said primary winding and said contacts in series across said battery; an impedance means connected across said secondary winding, said impedance means including a potentiometer means providing an intermediate contact connected to said post; a rectifier connected between said secondary winding and said impedance means to supply thereto a unidirectional potential of sufficient magnitude to charge said electroscope; an incandescent lamp connected to said battery; and means for mounting said lamp at the lower end of said post, said post being hollow to transmit light from said incandescent lamp through said post and into said dosimeter housing.

References Cited in the file of this patent

UNITED STATES PATENTS

| | | |
|---|---|---|
| 2,496,886 | Molloy et al. | Feb. 7, 1950 |
| 2,516,209 | Henninger | July 25, 1950 |
| 2,545,386 | Rich | Mar. 13, 1951 |
| 2,613,327 | Beckman et al. | Oct. 7, 1952 |
| 2,634,374 | Shonka | Apr. 7, 1953 |
| 2,638,551 | Laudsverk et al. | May 12, 1953 |